US007036136B1

(12) United States Patent
Worthy

(10) Patent No.: US 7,036,136 B1
(45) Date of Patent: Apr. 25, 2006

(54) BIAS COMPENSATING REMOTE AUDIENCE SURVEY SYSTEM AND METHOD

(75) Inventor: David G. Worthy, Gilbert, AZ (US)

(73) Assignee: Consyntrix, Inc., Osprey, FL (US)

( * ) Notice: Subject to any disclaimer, the term of this patent is extended or adjusted under 35 U.S.C. 154(b) by 0 days.

(21) Appl. No.: 09/556,339

(22) Filed: Apr. 24, 2000

Related U.S. Application Data

(63) Continuation of application No. 09/038,267, filed on Mar. 10, 1998, now Pat. No. 6,081,690.

(51) Int. Cl.
*H04N 9/00* (2006.01)
*H04N 7/16* (2006.01)

(52) U.S. Cl. .......................... 725/15; 725/18; 455/2.01

(58) Field of Classification Search .................... 725/9, 725/13, 14, 15, 18; 455/2.01; H04N 9/00, H04N 7/16
See application file for complete search history.

(56) References Cited

U.S. PATENT DOCUMENTS 3,434,150 A 3/1969 Wernlund ...................... 346/1
4,577,220 A 3/1986 Laxton et al. ................ 358/84
4,599,644 A 7/1986 Fischer .......................... 455/2
4,618,995 A 10/1986 Kemp .......................... 455/2
4,955,070 A 9/1990 Welsh et al. ................... 455/2
5,410,724 A 4/1995 Worthy .......................... 455/2
5,561,835 A 10/1996 Worthy .......................... 455/2
5,749,043 A 5/1998 Worthy .......................... 455/2
5,819,155 A 10/1998 Worthy et al. ................. 455/2
5,839,050 A 11/1998 Bachr et al. ................... 455/2
6,643,494 B1 * 11/2003 Worthy ...................... 455/2.01
6,684,054 B1 * 1/2004 Worthy ...................... 455/2.01
6,813,475 B1 * 11/2004 Worthy ...................... 455/2.01

* cited by examiner

*Primary Examiner*—Vivek Srivastava
(74) *Attorney, Agent, or Firm*—Banner & Witcoff, Ltd.

(57) ABSTRACT

A bias compensating remote audience survey system (34) is configured to identify radio stations (162) to which tuners (24) are tuned. The tuners (24) have predetermined signals (26) emitted therefrom. The survey system (34) employs a method (152) of compensating for a station bias, or preference, toward or against one or more of radio stations (162). The method (152) includes measuring durations (62) over which the predetermined signals (26) are received by the survey system (34). The durations (62) are then combined by averaging to form a station average detection length (ADL) value (74) specific to one of the radio stations (162). The station ADL value (74) is compared to a multi-station ADL parameter (86). A sensitivity level (146) for the one radio stations (162) is adjusted in response to the comparison to compensate for station bias.

7 Claims, 5 Drawing Sheets

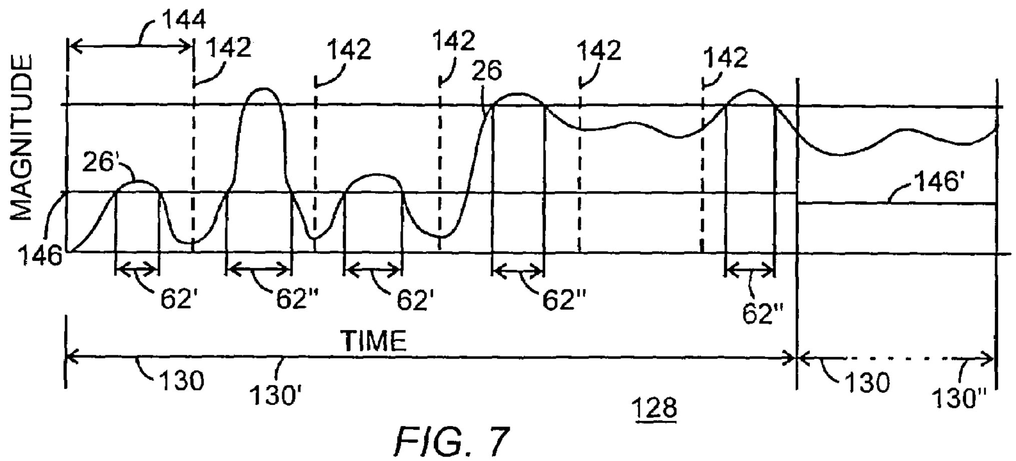

*FIG. 7*

| SURVEY PERIOD | RADIO STATIONS | RADIO BROADCAST SIGNALS (FREQ.) | LO SIGNALS (FREQ.) | DETECTION # | STATION ADL | MULTI-STATION ADL |
|---|---|---|---|---|---|---|
| 1 | KABC<br>KDEF<br>⋮<br>KXYZ | 88.1<br>91.7<br>⋮<br>107.9 | 98.8<br>102.4<br>⋮<br>118.6 | XX<br>YY<br>⋮<br>ZZ | .33<br>1.05<br>⋮<br>1.09 | 1.0 |
| 2 | KABC<br>KDEF<br>⋮<br>KXYZ | 88.1<br>91.7<br>⋮<br>107.9 | 98.8<br>102.4<br>⋮<br>118.6 | | 1.02<br>.99<br>⋮ | 1.0 |
| 3 | KABC<br>KDEF<br>⋮<br>KXYZ | 88.1<br>91.7<br>⋮<br>107.9 | 98.8<br>102.4<br>⋮<br>118.6 | | ⋮ | ⋮ |
| ⋮ | ⋮ | ⋮ | ⋮ | ⋮ | ⋮ | ⋮ |
| n | KABC<br>KDEF<br>⋮<br>KXYZ | 88.1<br>91.7<br>⋮<br>107.9 | 98.8<br>102.4<br>⋮<br>118.6 | | ⋮ | ⋮ |

130, 162, 27, 26, 98, 164, 74, 86, 130', 130", 27', 27", 26', 26", 74', 86'

160

*FIG. 9*

BIAS COMPENSATING REMOTE AUDIENCE SURVEY SYSTEM AND METHOD

This application is a continuation of, and claims priority to, U.S. patent application Ser. No. 09/038,267, filed Mar. 10, 1998, now issued as U.S. Pat. No. 6,081,690.

TECHNICAL FIELD OF THE INVENTION

The present invention relates generally to identifying broadcast stations to which tuners are tuned. More specifically, the present invention relates to compensating for the effects of bias when identifying, from a remote location, the broadcast stations to which tuners are tuned.

BACKGROUND OF THE INVENTION

The commercial broadcast industry and businesses which advertise through the RF broadcast media need to know the sizes of the audiences which are tuned to particular stations at particular times. This need has been met primarily through the use of verbal or written audience participation surveys. With respect to radio, a majority of the listening occurs in automobiles. However, a problem with written surveys is that listeners cannot practically make a record of their listening tendencies while driving.

In order to make a record of listening tendencies while driving, passive electronic RF monitoring equipment has been used to remotely identify the stations to which tuners may be tuned. Generally speaking, audiences' tuners use predetermined signals, such as local oscillator signals, that are related to the frequencies of the respective stations currently being tuned in. The local oscillator signals are broadcast or otherwise emitted from the tuners as very weak signals that sensitive monitoring equipment can detect.

This remote monitoring technique is desirable because it does not require cooperation from an audience, hence reducing or eliminating a host of inaccuracies and costs associated with audience participation surveys. Furthermore, large sample sizes may be monitored at low cost relative to audience participation survey techniques.

Using survey methodology in a remote monitoring system, a highly desirable goal is to maintain a "level playing field", i.e., all stations have an equal opportunity of being recorded during the survey. When a vehicle is detected passing through a survey zone, no bias or preference should occur in detecting the station on the vehicle's radio over another station, regardless of its frequency.

Prior art conventional remote monitoring systems have failed to adequately address many different situations that lead to skewed or biased survey data toward or against an individual station or groups of stations. This bias, described as station bias herein, is different for differing radio stations. For example, multiple tuners located near one another and tuned to the same station may be indistinguishable from one another by the monitoring equipment so as to bias survey data in favor of less popular stations. In addition, conventional monitoring equipment may fail to identify some radio stations due to a weak local oscillator signal at a particular tuner.

The level of background electronic noise may cause local oscillator signals at some frequencies to be more readily detectable than other frequencies leading to station bias in favor of stations whose related local oscillator signals may have a lower level of background noise. In addition, traffic speed, or unexpected variation in traffic speed, affects the duration over which the local oscillator signals may be detected, thus leading to station bias. Still further, the accuracy of the survey data obtained from conventional equipment may be affected by environmental conditions. Temperature and/or humidity fluctuations affect electronic system monitoring and detecting capability differently along the range of frequencies of local oscillator signals. Hence, local environmental conditions may bias data in favor of some stations and against other stations.

U.S. Pat. No. 5,410,724 discusses a remote radio monitoring system and methodology for obtaining accurate survey data. This system ignores certain detectable and detected data which might otherwise be included in a survey to refrain from introducing unfair biases. This system also attempts to equalize the detection of the noisiest local oscillator signal with the detection of the other less noisy oscillator signals. Furthermore, this system attempts to prevent station bias caused by environmental fluctuations with the proper selection of electronic components.

However, in the system described in U.S. Pat. No. 5,410,724, as well as the other prior art systems, there was no way of obtaining a measure of the accuracy of the survey data to determine if biases exist toward or against individual frequencies or groups of frequencies within the band of broadcast frequencies for the broadcast stations. Furthermore, when a station bias does exist for an individual broadcast station, these systems do not compensate for this station bias.

SUMMARY OF THE INVENTION

Accordingly, it is an advantage of the present invention that a system and method are provided for compensating for bias when identifying the stations to which tuners are tuned.

Another advantage is that the present invention improves the accuracy of audience survey data.

Another advantage is that the present invention provides a parameter for determining if biases toward or against individual radio stations or groups of stations are present in survey data.

Yet another advantage is that the present invention notifies an operator when bias is present in survey data.

The above and other advantages of the present invention are carried out in one form in a remote audience survey system, by a method of compensating for a station bias. The survey system is configured to identify radio stations to which tuners are tuned, and the tuners have predetermined signals emitted therefrom. The method includes measuring durations over which the predetermined signals, which describe one of the radio stations, are identified by the survey system. The durations are combined to form a characteristic detection statistic for the one radio station. A sensitivity level is then adjusted for the one radio station in response to the characteristic detection statistic to compensate for the station bias.

The above and other advantages of the present invention are carried out in another form by a bias compensating remote audience survey system for identifying radio stations to which tuners are tuned. The tuners have predetermined signals emitted therefrom, and the predetermined signals describe one of the radio stations. The system includes an antenna for establishing a detection zone within which the predetermined signals are occasionally emitted. A receiver is coupled to the antenna and receives the predetermined signals. A timer is coupled to the receiver and measures durations over which the predetermined signals are received. A compiler is coupled to the timer and compiles the durations to form a characteristic detection statistic for the one radio station. A bias compensator is coupled between the compiler and the receiver and adjusts a sensitivity level in response to the characteristic detection statistic.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a graph of local oscillator signals being received by the receiver during survey periods;

FIG. 9 shows an exemplary spreadsheet array of survey data sorted by radio stations within each of a plurality of survey periods.

DETAILED DESCRIPTION OF THE PREFERRED EMBODIMENTS

Figure 1:
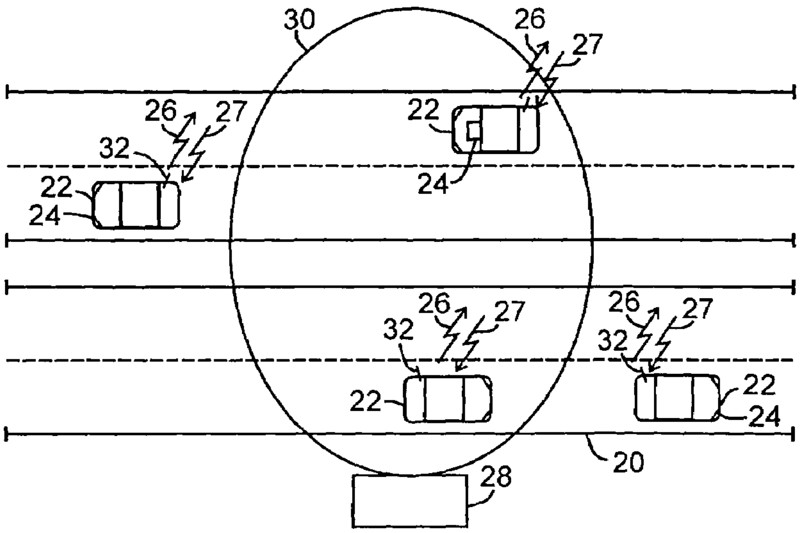
FIG. 1 shows a layout diagram of an example environment within which a preferred embodiment of the present invention may operate.

FIG. 1 shows a layout diagram of an example environment within which a preferred embodiment of the present invention may operate. FIG. 1 shows a road 20 on which any number of radio-equipped vehicles 22, such as cars, trucks, motorcycles, and the like, may travel in either of two directions.

Many of vehicles 22 include a radio or tuner 24 for receiving radio broadcast signals 27 for commercial broadcast stations, such as conventional AM, FM, television, and the like. For purposes of the following description, radios and tuners are synonymous including all of the components thereof, such as antennas, loudspeakers, and the like. Radios 24 detect radio broadcast signals 27 through a well known demodulation process which requires radios 24 to generate predetermined signals, such as local oscillator (LO) signals 26 related to radio broadcast signals 27 for radio stations.

The preferred embodiment of the present invention described herein compensates for station bias when identifying FM radio stations to which some of radios 24 may be tuned. However, those skilled in the art will appreciate that the present invention may be successfully applied to compensating for station bias when identifying AM, L-band, television stations, and so forth, either alone or in combination with the compensation of station bias and the identification of FM stations. Moreover, the predetermined signals need not be local oscillator signals generated by radios 24, but may be any signal generated or echoed by associated elements of radios 24, including antennas, or loudspeakers, that can be related to radio broadcast signals 27.

For the conventional FM band standard used in the United States, each of LO signals 26 oscillate at a frequency around 10.7 MHz above the frequency of the radio broadcast signal 27 for a radio station to which a radio 24 is currently tuned. In other words, since the FM band for radio broadcast signals 27 is 88.1–107.9 MHz, LO signals 26 are in even tenth-MHz frequencies in the band of 98.8–118.6 MHz. Thus, the frequency of one of radio broadcast signals 27, and ultimately the radio station, to which a radio 24 is tuned can be identified by detecting the presence of the tuner's LO signal 26.

The present invention uses an antenna 28 to establish a detection zone 30 within which LO signals 26 from vehicles 22 may be detected. Detection zone 30 extends across road 20 to cover traffic lanes for two directions. Preferably, antenna 28 is a directional antenna with a substantially flat response through the frequency band of interest (i.e. LO signals 26). The directionality of antenna 28 reduces the likelihood of interference from spurious RF signals emanating from outside detection zone 30.

LO signals 26 are very weak signals which are emitted from radio 24 primarily by a vehicle's antenna 32. The strength of each of LO signals 26 may vary significantly from vehicle 22 to vehicle 22. Those skilled in the art will appreciate that the detection zone 30 depicted in FIG. 1 represents an area in which one of LO signals 26 can be detected, and the duration of detection as vehicle 22 passes through zone 30 can be measured or timed. Detection zone 30 may vary significantly depending in part upon factors such as environmental conditions and electronic noise in and around detection zone 30, sensitivity level settings (discussed below) for each of LO signals 26, and the like.

Temperature and/or humidity fluctuations affect electronic system performance. Electronic components are rated as to their tolerance to such parameters. These fluctuations may affect the detection of LO signals 26 at certain frequencies differently than LO signals 26 at other frequencies which can lead to a station bias for or against certain LO signals 26.

Electronic noise can also vary greatly from area to area, frequency to frequency, and over time during the day and seasonally. In order to detect one of LO signals 26, the signal strength (discussed below) is typically greater than the level of electronic noise at the frequency of interest. Since the frequencies of interest are LO signals 26 in the band of 98.8–118.6 MHz, half of the frequencies are in the upper end of the band for FM radio broadcast signals 27 (which has a relatively high noise level and can vary greatly from frequency to frequency). The other half of the frequencies of LO signals 26 are in the lower half of the aircraft band (above the FM band) where very little noise is present. These differing noise levels can cause station bias at the upper end of the frequency band for FM radio broadcast signals 27 where LO signals 26 may not be detectable over the noise level.

In addition, seasonal changes, such as the presence or absence of leaves on trees, can affect the electronic noise levels at particular frequencies. Leaves on trees can block some electronic noise at particular frequencies to a certain degree during the spring and summer, whereas in winter or fall, when trees lose their leaves, noise levels may increase.

These seasonal changes may also produces station bias related to particular frequencies of LO signals 26.

Figure 2:
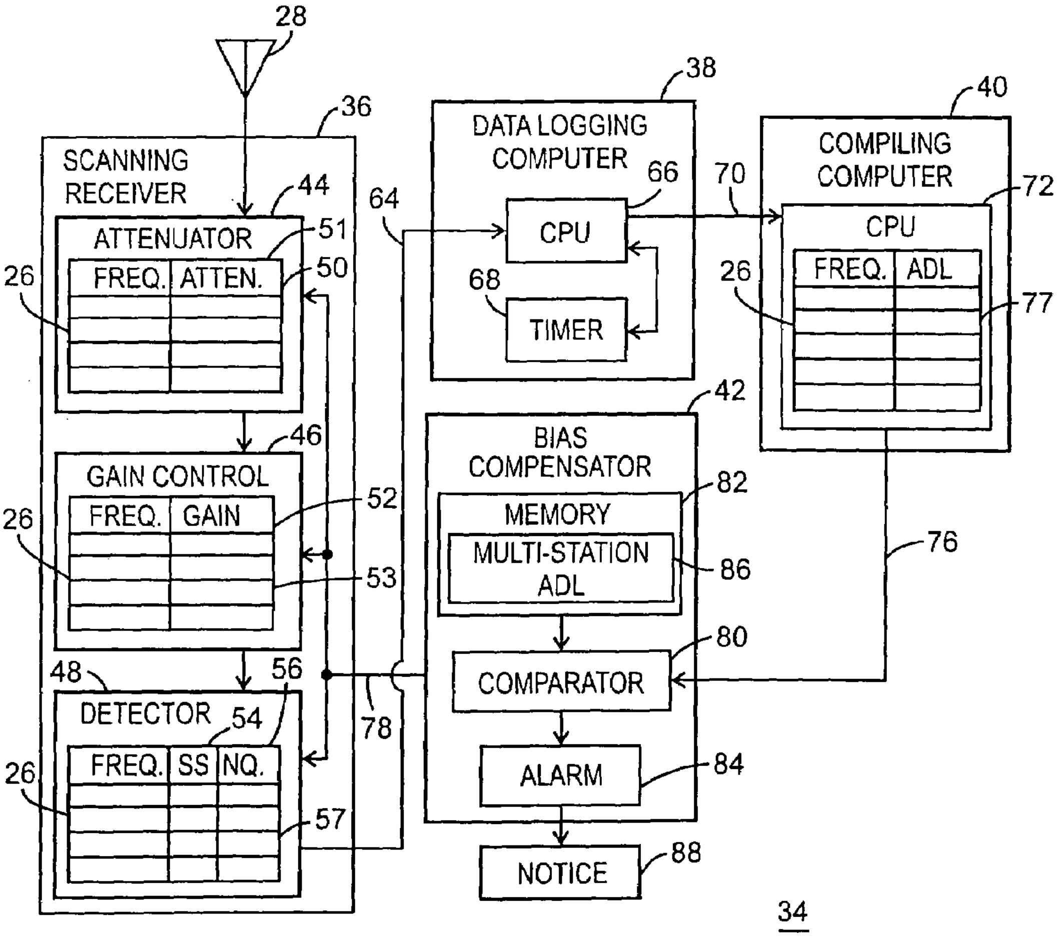
FIG. 2 shows a block diagram of a bias compensating remote audience survey system.

FIG. 2 shows a block diagram of a bias compensating remote audience survey system 34 constructed in accordance with a preferred embodiment of the present invention. System 34 includes antenna 28, discussed above, a scanning receiver 36, a data logging computer 38, a compiling computer 40, and a bias compensator 42. Receiver 36 and data logging computer 38 are preferably located together near antenna 28. In addition, the processing functions of data logging computer 38, compiling computer 40, and bias compensator 42 may be performed by a single unit.

Generally, scanning receiver 36 and data logging computer 38 are configured to receive a portion of LO signals 26 at any frequency in the band of LO frequencies. When one of LO signals 26 is received, receiver 36 produces two outputs (not shown) that are representative of LO signals 26. The two outputs are compared with thresholds for those two outputs, and detection of one of LO signals 26 is made when the produced two outputs exceed the thresholds. Scanning receiver 36 is then configured to receive LO signals 26 at another frequency in the band of LO frequencies, and the detection process is repeated.

Scanning receiver 36 is coupled to antenna 28, and LO signals 26 (FIG. 1) received by antenna 28 are transmitted to scanning receiver 36 for processing. Receiver 36 includes an antenna attenuator (ATTENUATOR) 44, a gain control circuit (GAIN CONTROL) 46, and a detector 48.

Received LO signals 26 are first communicated to attenuator 44. Attenuator 44 serves to equalize the detection of the noisiest ones of LO signals 26 with the detection of the other less noisy ones of LO signals 26 by applying an antenna attenuator value 50 relative to LO signals 26. In other words, greater attenuation is applied to less noisy ones of LO signals 26 to balance the detection of less noisy LO signals 26 with noisier LO signals 26. Each antenna attenuator value 50 is a prescribed value for a specific one of LO signals 26 and may be stored in an attenuator memory element 51 of attenuator 44.

LO signals 26 are communicated from attenuator 44 to an RF conditioner, or gain control circuit 46, where a gain value 52 is applied to LO signals 26. Each gain value 52 is a prescribed value for a specific one of LO signals 26 and may be stored in a gain memory element 53 of gain control circuit 46. The conditioned LO signals 26 are then communicated to an IF detector, or detector 48, where specific ones of LO signals 26 are identified.

In addition to identifying LO signal 26 frequency, detector 48 of receiver 36 produces and evaluates the two outputs, signal strength and noise quieting values (described below), that are representative of LO signals 26. Detector 48 identifies a received one of LO signals 26 by the detection of signal strength and noise quieting values output by receiver 36 that reach signal strength (SS) and noise quieting (NQ) thresholds 54 and 56, respectively, as prescribed for specific LO signals 26. SS and NQ thresholds 54 and 56, respectively, may be stored relative to frequencies for LO signals 26 in a threshold memory element 57 of detector 48. For clarity of illustration, threshold memory element 57 is located in detector 48, however those skilled in the art will recognize that threshold memory element 57 is a memory array that may be stored in memory (not shown) of data logging computer 38.

As is conventional, receiver 36 detects signals that have a magnitude exceeding a sensitivity level (discussed below) for one of LO signals 26. The sensitivity level is adjusted by modifying antenna attenuator value 50, gain value 52, SS threshold 54 and/or NQ threshold 56. Antenna attenuator value 50 and gain value 52 are individually adjustable for each of LO signals 26 in order to equalize the detection of LO signals 26 (i.e. each possible LO frequency). SS threshold 54 is a minimum detectable magnitude of signal strength of LO signals 26 for one of radio broadcast signals 27. NQ threshold 56 is a maximum level of noise quieting that survey system 34 achieves in the presence of LO signals 26 associated with one of radio broadcast signals 27.

Figure 3:
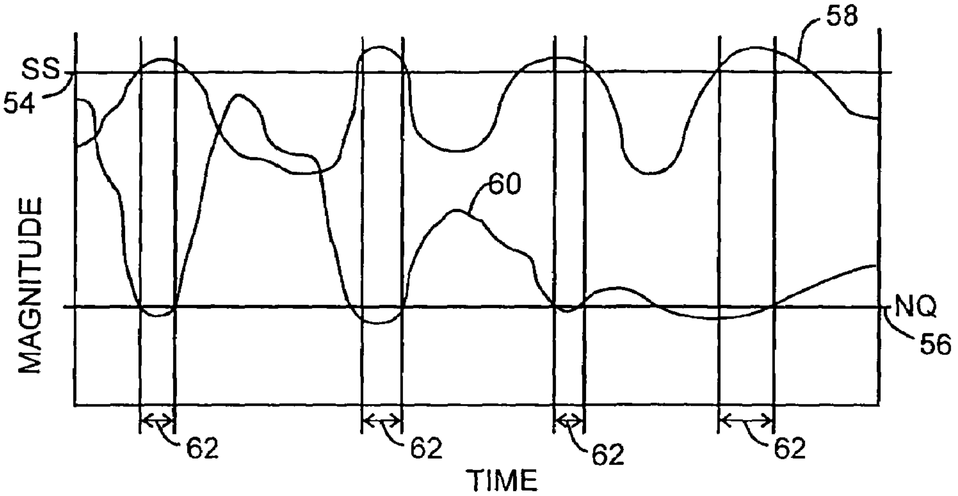
FIG. 3 shows an exemplary graph of the relationship between signal strength and noise quieting values and their respective thresholds for measuring durations of signal detection.

FIG. 3 shows an exemplary graph of the relationship between a signal strength value 58 and a noise quieting value 60, and their respective SS and NQ thresholds 54 and 56 for measuring durations 62 of signal detection of one of LO signals 26. Each of LO signal frequencies 26 has a prescribed SS threshold 54 and a NQ threshold 56. For clarity of illustration, signal strength value 58 is shown as an upgoing signal, while noise quieting value 60 is shown as a downgoing signal. However, those skilled in the art will recognize that depending on how the values are mathematically manipulated, signal value 58 and noise quieting value 60 need not be upgoing and downgoing, respectively. When signal strength value 58 for the one of LO signals 26 to which receiver 36 is tuned rises above SS threshold 54 and when noise quieting value 60 drops below NQ threshold 56, LO signal 26 is positively detected. Likewise, when signal strength value 58 drops below SS threshold 54 or when noise quieting value 60 rises above NQ threshold 56, LO signal 26 is no longer detected. Therefore, durations 62 represent lengths of time during which one of LO signals 26 is positively identified. Modifying SS and NQ thresholds 54 and 56, respectively, changes durations 62. Generally, decreasing SS threshold 54 and/or increasing NQ threshold 56 increases each of durations 62, whereas increasing SS threshold 54 and decreasing NQ threshold 56 decreases each of durations 62.

With reference back to FIG. 2, scanning receiver 36 represents a conventional scanner. Hence, those skilled in the art will readily recognize that many other features are included in scanning receiver 36. These may include a central processing unit, a voltage controlled crystal oscillator, additional memory, and so forth (not shown) and will not be discussed in detail herein.

Data logging computer 38 is coupled to scanning receiver 36 via a cable 64 for receiving data associated with LO signals 26 from receiver 36. Generally, data logging computer 38 monitors, controls, records, and reports on system operation and data logging. Data logging computer 38 includes a central processing unit (CPU) 66 which couples to a timer 68. Timer 68 measures durations 62 (FIG. 3) over which LO signals 26 are received by receiver 36. Data logging computer 38 stores identification of radio broadcast signals 27 identified by LO signals 26 and durations 62 generated by timer 68. Data logging computer 38 represents a conventional microprocessor based computer system. Hence, those skilled in the art will recognize the data logging computer 38 may include additional features such as memory, a disk drive, keyboard, modem, and so forth (not shown) and will not be discussed in detail herein.

Data logged by data logging computer 38 are communicated to compiling computer 40 via a data link 70. Data link 70 may be a link established through a modem and cellular telephone. Alternatively, data link 70 may be provided by physically carrying diskettes from data logging computer 38, or other such linking means.

Compiling computer 40 includes a central processing unit (CPU) 72 which is configured to compile durations 62 as measured by timer 68 to form a characteristic detection statistic 74 for LO signals 26. In the preferred embodiment, the characteristic detection statistic is a station average detection length (ADL) value 74 and is determined by averaging durations 62 for LO signals 26 received at one of the possible LO frequencies.

Durations 62, or the amount of time during which LO signals 26 are positively identified, are controlled by the settings for antenna attenuation value 50, gain value 52, SS threshold 54, and NQ threshold 56. Thus, station ADL value 74 is also affected by the settings for antenna attenuation value 50, gain value 52, SS threshold 54, and NQ threshold 56. By changing any of the above named settings, station ADL value 74 will change and an intentional bias for or against a radio station can be introduced into survey system 34 to compensate for, or mitigate, station bias produced by fluctuating environmental conditions or changing levels of electronic noise within zone 30 (FIG. 1).

Compiling computer 40 represents a conventional microprocessor based computer system. Hence, those skilled in the art will recognize that compiling computer 40 may include additional features such as memory, a disk drive, keyboard, display, and so forth (not shown) and will not be discussed in detail herein.

Bias compensator 42 is coupled between compiling computer 40 and scanning receiver 36 via links 76 and 78, respectively. Links 76 and 78 are conventional data communication links that may include a cable or radio frequency link provided via a modem and cellular telephone, and will not be described in detail herein.

Bias compensator 42 includes a comparator 80, memory 82, and an alarm 84. Station ADL value 74 compiled by compiling computer 40 is communicated via link 76 to comparator 80. Memory 82 stores a detection parameter 86. In the preferred embodiment, the detection parameter is a multi-station average detection length (ADL) parameter 86 and is formed by averaging durations 62 for all of LO signals 26 of interest. Comparator 80 is configured to compare station ADL value 74 for a specific one of the LO signal channels (i.e. a single broadcast station) to multi-station ADL parameter 86 stored in memory 82. Alarm 84, coupled to comparator 80, issues a notice 88 in response to comparison data (not shown) generated by comparator 80.

Notice 88 may be received by an operator to determine if survey data is valid or if adjustment parameters (not shown) should be sent to scanning receiver 36 to compensate for station bias. The adjustment parameters are sent via link 78 to modify antenna attenuator value 50, gain value 52, SS threshold 54, and/or NQ threshold 56 in order to compensate for station bias related to one of LO signals 26 representing one of radio broadcast signals 27 (FIG. 1).

Although notice 88 is issued to inform an operator of station bias, nothing in the present invention requires the decision to modify antenna attenuator value 50, gain value 52, SS threshold 54, and/or NQ threshold 56 to be made by a human. Rather, bias compensator 42 may be configured to automatically provide receiver 36 with adjustment parameters to compensate for the station bias.

Figure 4:
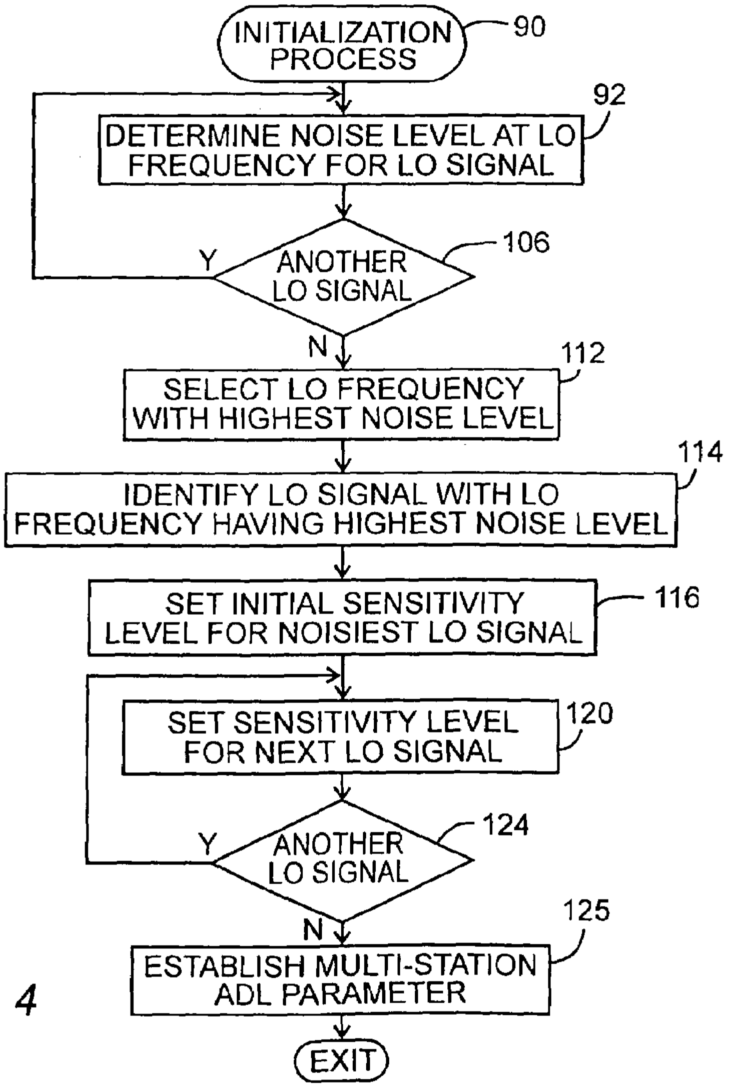
FIG. 4 shows a flow chart of an initialization process performed by the bias compensating remote audience survey system.

FIG. 4 shows a flow chart of an initialization process 90 performed by bias compensating remote audience survey system 34. Prior to using system 34 to collect survey data about radio broadcast signals 27, system 34 is initially adapted to achieve a "level playing field", i.e. an unbiased survey of LO signals 26 (FIG. 1).

Process 90 sets initial sensitivity levels for the identification of the radio stations to be surveyed by collecting detection data on road 20 (FIG. 1). This detection data is not relied upon as survey data, but rather is used to adjust antenna attenuator value 50, gain value 52, SS threshold 54 and/or NQ threshold 56 at each individual frequency of LO signals 26 to be surveyed. Process 90 may extend over several days in order to obtain enough data for setting initial sensitivity levels, and may be performed at system start-up or when anomalies in survey data indicate that system reinitialization is desirable. Survey system 34 is placed in an initialization mode, and process 90 begins with a task 92.

Figure 5:
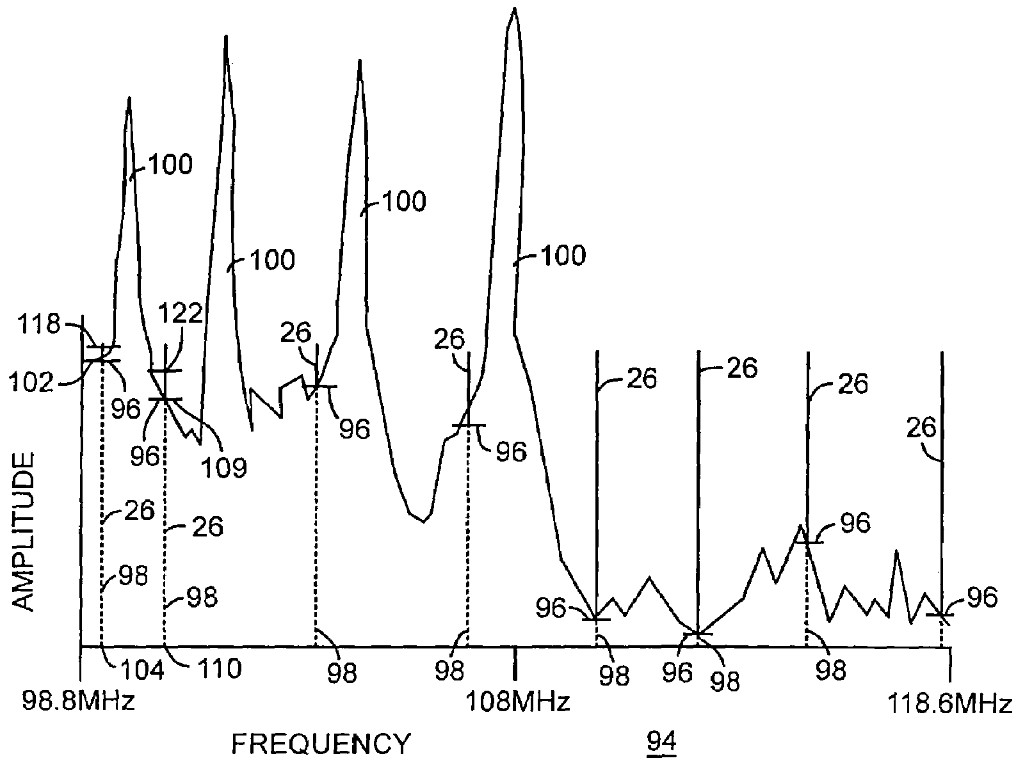
FIG. 5 shows an exemplary graph that relates local oscillator signals to noise levels determined at each of the frequencies of the local oscillator signals.

To further illustrate the tasks of process 90, FIG. 5 shows an exemplary graph 94 that relates the predetermined signals, or LO signals 26, to noise levels 96 determined at each of LO frequencies 98 for LO signals 26. As discussed previously, LO frequencies 98 are even tenth-MHz frequencies, that are offset 10.7 MHz from station frequencies 100 for radio broadcast signals 27 (FIG. 1).

Those skilled in the art will appreciate that graph 94 illustrates a hypothetical situation, and that the signal amplitude versus frequency picture experienced by system 34 (FIG. 2) will vary from instant to instant and from location to location. Nevertheless, noise levels 96 in the lower half of the frequency range for LO signals 26 are usually significantly higher than noise levels 96 in the upper half of the frequency range for LO signals 26, as illustrated in graph 94.

With reference back to FIG. 4, task 92 causes system 34 to determine a noise level 96 at one of LO frequencies 98 that represents a subset of LO signals 26. In exemplary graph 94 (FIG. 5), a first noise level 102 at a first LO frequency 104 is determined. Determination of noise levels 96 may be made by measuring the amount of electronic noise at one of LO frequencies 98 for a portion of LO signals 26 for a duration of time that is sufficient to capture most of the noise fluctuations occurring over time. Noise levels 96 related to each of LO frequencies 98 is desirably stored in memory (not shown) in compiling computer 40 (FIG. 2).

After task 92 (FIG. 4), process 90 proceeds to a query task 106 which causes system 34 to determine if there is another one of LO signals 26 for which a noise level should be determined. When query task 106 determines that there is a another subset of LO signals 26 (i.e. another LO frequency 98) for which a noise level 96 should be determined, process 90 loops back to task 92 to make another noise level determination. In the exemplary situation shown in graph 94 (FIG. 5), a second noise level 109 (FIG. 5) at a second LO frequency 110 (FIG. 4) relating to a second portion of LO signals 26 (FIG. 1) is determined. In this manner, task 92 is repeated until a noise level 96 has been determined at each of LO frequencies 98 for each of LO signals 26.

When task 106 determines that there are no other LO signals 26 for which a noise level determination is to be made, process 90 proceeds to a task 112. Task 112 causes compiling computer 40 (FIG. 2) to select one of LO frequencies 98 with the highest of noise levels 96.

In conjunction with task 112, a task 114 identifies the one of LO signals 26 (FIG. 1) with the LO frequency 98 having the highest of noise levels 96 as the noisiest of LO signals 26. In the exemplary situation shown in graph 94 (FIG. 5) first noise level 102 for first LO frequency 104 is greater than noise levels 96 for the remaining ones of LO frequencies 98. Therefore, the one of LO signals 26 that corresponds to first frequency 104 is the noisiest of LO oscillator signals 26.

In response to task 114, a task 116 sets a first initial sensitivity level 118 for the noisiest of LO signals 26. Correspondingly in the exemplary situation of graph 94 (FIG. 5), first initial sensitivity level 118 is set for first LO frequency 104.

First initial sensitivity level 118 provides an amplitude threshold over which first LO frequency 104 must reach in order for first LO frequency 104 to be detectable by survey system 34. First initial sensitivity level 118 is set by modifying antenna attenuator value 50, gain value 52, SS threshold 54, and/or NQ threshold 56 (discussed previously in conjunction with FIG. 2). Modifications may include decreasing antenna attenuator value 50, increasing gain value 52, decreasing SS threshold 54, and/or increasing NQ threshold 56 so that first LO frequency 104 (i.e. the noisiest of LO signals 26) can be more readily detected. By modifying one or more of the above listed parameters, station ADL value 74 (FIG. 2) for the noisiest one of LO signals 26 is established.

Once first initial sensitivity level 118 is set in task 116, process 90 (FIG. 4) proceeds to a task 120. Task 120 initializes a second initial sensitivity level for another one of LO signals 26 at another one of LO frequencies 98.

Referring again to graph 94 (FIG. 5), a second initial sensitivity level 122 is set in response to first initial sensitivity level 118. Second initial sensitivity level 122 is set so that station ADL value 74 for second LO frequency 110 is approximately equal to station ADL value for first LO frequency 104. Level 122 is set by modifying antenna attenuation value 50 (FIG. 2), gain value 52 (FIG. 2), SS threshold 54, and/or NQ threshold 56 specific to second LO frequency 110. Following task 120, the station ADL value 74 for second LO frequency 110 is established and is approximately the same as station ADL value 74 for first LO frequency 104.

Following task 120, a query task 124 determines if there is another one of LO signals 26 at LO frequencies 98 for which an initial sensitivity level is to be set. When there is another one of LO signals 26, process 90 loops back to task 120 to set an initial sensitivity level for another one of LO signals 26. In this manner, task 120 is repeated until sensitivity levels have been determined at each of LO frequencies 98 for each of LO signals 26.

When task 124 determines that there are no other LO signals 26 for which a sensitivity level is to be determined, process 90 proceeds to a task 125. Task 125 combines station ADL values 74 for each of frequencies 98 to establish multi-station ADL parameter 86 (FIG. 2) to be stored in memory 82 (FIG. 2).

Although initialization process 90 is a preferred technique for establishing initial sensitivity levels and an initial multi-station ADL parameter 86, there may be other techniques for establishing these parameters in order to achieve a level playing field (i.e. initialize an unbiased survey system) prior to collection of survey data.

Figure 6:
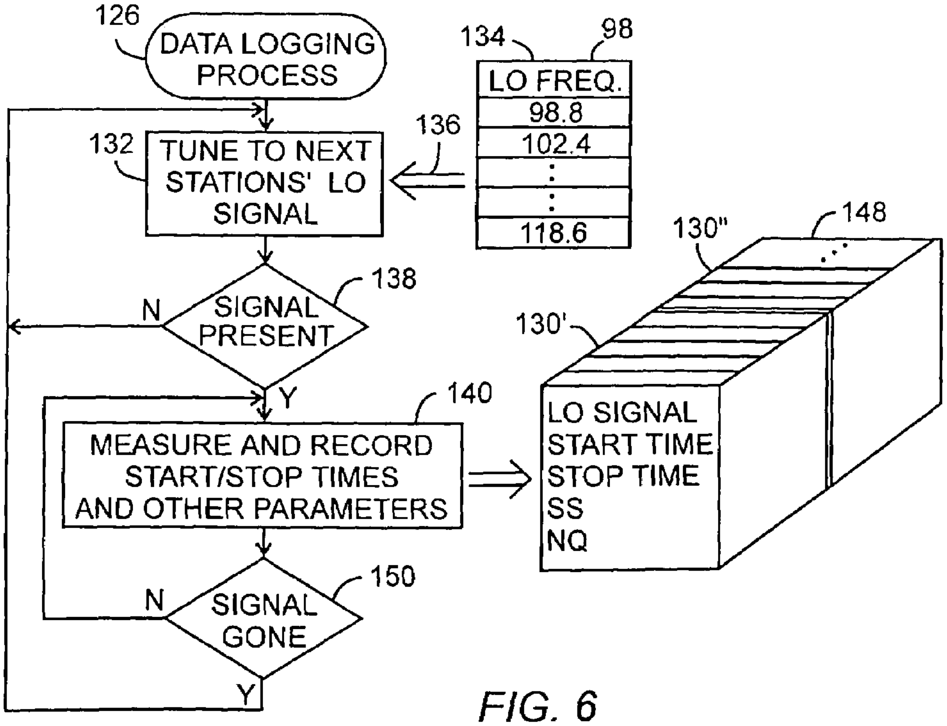
FIG. 6 shows a flow chart of a data logging process performed by a scanning receiver and a data logging computer of the bias compensating remote audience survey system.

With reference to FIGS. 6–7, FIG. 6 shows a flow chart of a data logging process 126 performed by scanning receiver 36 (FIG. 2) and data logging computer 38 (FIG. 2) of bias compensating remote audience survey system 34 (FIG. 2). FIG. 7 shows a graph 128 of local oscillator signals 26 being received by receiver 36 during survey periods 130. Process 126 is implemented by bias compensating remote audience survey system 34 to provide unbiased identification of radio stations to which radios 24 (FIG. 1) are tuned.

Process 126 begins with a task 132. In task 132, data receiver 36 (FIG. 2) tunes to one of LO signals 26. An array 134 is arranged with LO frequencies 98 for each of LO signals 26 to be included in logging process 126. A pointer 136 is incremented to one of LO frequencies 98 to determine the next LO frequency 98 to which receiver 36 is tuned.

In response to task 132, a query task 138 determines if an LO signal 26 at the one of LO frequencies 98 to which receiver 36 is tuned is being emitted in detection zone 30 (FIG. 1). LO signals 26 are detected when the magnitude for one of LO signals 26 is greater than a sensitivity level specific to the one of LO frequencies 98. When query task 138 determines that LO signal 26 is not present, process 126 loops back to task 132. Task 132 then increments pointer 136 and tunes to another one of LO frequencies 98 for the next stations' LO signals 26.

Referring to exemplary graph 128 (FIG. 7), dashed lines 142 represent tuning episodes 142 for receiver 36. At each of tuning episodes 142, receiver 36 tunes to another one of LO frequencies 98 for LO signals 26. In a first tune period 144, receiver 36 tunes to a first one of LO frequencies 98 for first LO signals 26'. First tune period 144 is a duration of time that elapses between tuning episodes during which receiver 36 is configured to detect one of LO frequencies 98. In addition, first LO signals 26' is that portion of LO signals 26 having the one of LO frequencies 98 to which receiver 36 is tuned. First LO signals 26' at a first LO frequency 98 are detected if the magnitude of the LO frequency 98 for first LO signals 26' is greater than a first sensitivity level 146. When query task 138 determines that LO signal 26 is present, process 126 proceeds with a task 140.

Task 140 measures and records start and stop times for one of LO signals 26 to which receiver 36 is tuned in a data log 148. In addition, task 140 records other parameters, such as signal strength value 58 (FIG. 3) and noise quieting value 60 (FIG. 3) for the one of LO signals 26 in data log 148. Data log 148 is desirably maintained in memory (not shown) of data logging computer 38. Data log 148 is desirably partitioned into survey periods (i.e. first survey period 130' and second survey period 130") for later data processing (discussed below).

In conjunction with task 140, a query task 150 determines if the one of LO signals 26 is gone. LO signals 26 are no longer detected when signal strength value 58 falls below SS threshold 54 or when noise quieting value 60 rises above NQ threshold 56. When query task 150 determines that the one of LO signals 26 is not gone, program control loops back to task 140 to continue logging information into data log 148.

When query task 150 determines that the LO signal 26 is gone, program control loops back to task 132 to tune to another one of LO frequencies 98 to continue to collect survey records. Process 126 is ongoing to provide a continual log of survey data during survey periods 130.

Figure 8:
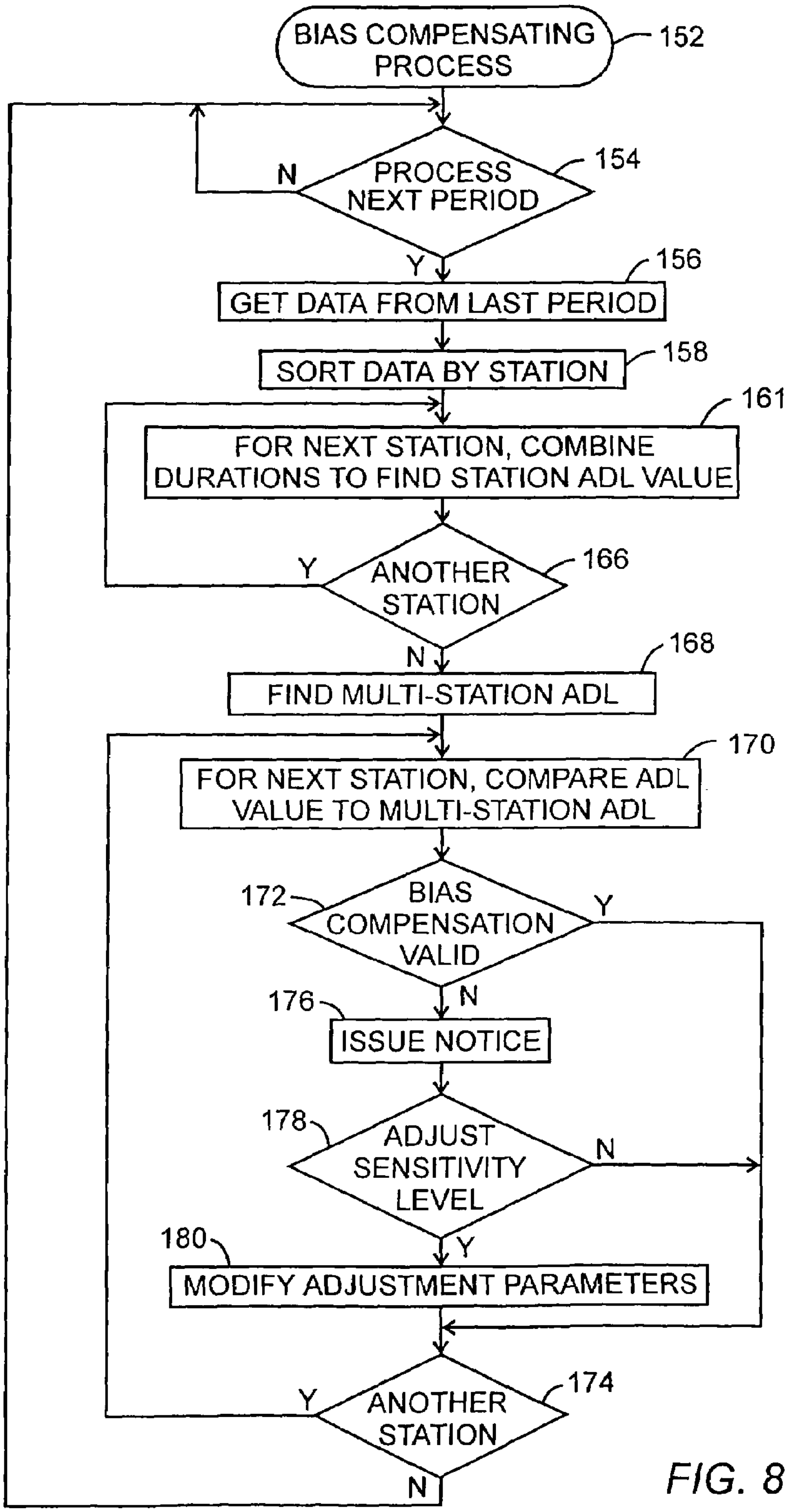
FIG. 8 shows a flowchart of a bias compensating process performed by a compiling computer and a bias compensator of the bias compensating remote audience survey system.

FIG. 8 shows a flowchart of a bias compensating process 152 performed by compiling computer 40 (FIG. 2) and bias compensator 42 (FIG. 2) of bias compensating remote audience survey system 34 (FIG. 2). Process 152 is implemented to determine a level of validity of the survey results and to compensate for any station bias that might be present.

Bias compensating process 152 begins with a query task 154. Query task 154 determines if the remainder of process 152 should be implemented for one of survey periods 130. Generally, process 152 is performed at the end of data collection for one of survey periods 130, for example, for a first survey period 130' (FIG. 7). If one of survey periods 130 is not over, survey data is not to be processed yet and program control loops back to query task 154 to wait until the appropriate time for initiating process 152. If survey data is to be processed, program control proceeds to a task 156.

Task 156 causes compiling computer 40 to get data from data logging computer 38 from the last period. In other words, data records from one of survey periods 130 in data log 148 (FIG. 6) are transmitted via data link 70 (FIG. 2) to compiling computer 40.

Following task 156, a task 158 sorts data to obtain information regarding the radio stations which were surveyed. FIG. 9 shows an exemplary spreadsheet array 160 of survey data sorted by radio stations 162 within each of a plurality of survey periods 130. Spreadsheet array 160 shows radio stations 162 during survey periods 130. Radio stations 162 are shown with the associated radio broadcast signals 27 and the related LO signals 26 at LO frequencies 98.

Spreadsheet array 160 may also include a detection number 164 for each of radio stations 162. Detection number 164 indicates how many times one of radio stations 162 was positively identified during one of survey periods 130. Spreadsheet array 160 also includes station ADL 74 and multi-station ADL 86 determined for survey periods 130. Those skilled in the art will recognize that other related information may be included in spreadsheet array 160. For example, difference values between station ADL 74 and multi-station ADL 86, percentage difference, and other values that aid a user or computer program in the identification of station bias for radio stations 162 may be included in spreadsheet array 160.

Following sorting task 158, a task 161 finds station ADL value 74 for one of radio stations 162. To determine station ADL value 74, start and stop times in data log 148 (FIG. 6) downloaded from data logging computer 38 (FIG. 2) are processed to obtain durations 62 (FIG. 3). Durations 62 are then combined by averaging to produce station ADL value 74 for one of radio stations 162.

Following task 161, a query task 166 determines if there is another one of radio stations 162 for which a station ADL value 74 should be found. If query task 166 is affirmative, program control loops back to task 161 to calculate another station ADL value 74 for another one of radio stations 162.

When query task 166 determines that there is not another one of radio stations 162 for which a station ADL value 74 is needed (in other words station ADL value 74 has been calculated for each of radio stations 162), then process 152 proceeds with a task 168.

Task 168 merges durations 62 from each of the detections of radio stations 162 in one of survey periods 130 to obtain multi-station ADL parameter 86 for the one survey period 130. Multi-station ADL parameter 86 is calculated by averaging durations 62. Referring momentarily to FIG. 9, a multi-station ADL parameter 86' is established for a first survey period 130'. Multi-station ADL parameter 86' replaces a previously stored multi-station ADL parameter 86 in memory 82 (FIG. 2) of bias compensator 42 (FIG. 2). It should be noted that numbers indicated for ADL values 74 and multi-station ADL parameter 86' in spreadsheet array 160 represent a hypothetical situation for clarity of illustration.

Following task 168, a task 170 is performed. Task 170 is performed by comparator 80 (FIG. 2) to compare a station ADL value 74 for one of radio stations 162 to multi-station ADL parameter 86 from one of survey periods 130.

In conjunction with task 170, a query task 172 determines if a level of bias compensation of survey data for one of radio stations 162 is valid. To determine validity of the survey data, station ADL value 74 for the one of radio stations 162 is compared to multi-station ADL parameter 86 for the same one of survey periods 130. When comparator 80 (FIG. 2) of bias compensator 42 (FIG. 2) finds that station ADL value 74 is approximately equal to multi-station ADL parameter 86, the survey data for the one of radio stations 162 is determined to be valid. In other words, the intentional bias introduced into survey system 34, for or against the one of radio stations 162, is adequate to compensate for station bias produced by environmental conditions and electronic noise in detection zone 30 (FIG. 1). Following an affirmative response to task 172, program control proceeds to a query task 174 (discussed below).

In query task 172, when comparator 80 finds that a level of bias compensation may not be valid, in other words, station ADL value 74 is not approximately equal to multi-station ADL parameter 86, program control proceeds to a task 176. Thus station bias may be identified when station ADL value 74 does not approximately equal multi-station ADL parameter 86. As shown in exemplary spreadsheet array 160 (FIG. 9), a first station ADL value 74' is not approximately equal to multi-station ADL parameter 86' for a first survey period 130', therefore process 126 proceeds with task 176.

Station ADL value 74 may not equal multi-station ADL parameter 86 when survey system 34 has not adequately compensated for station bias toward or against one of radio broadcast signals 27 associated with one of LO signals 26. On the other hand, station ADL value 74 may differ from multi-station ADL parameter 86 under other extenuating circumstances such as an event in road 20 (FIG. 1) that alters the normal traffic pattern or a special radio event which causes drivers to tune to a different one of radio stations 162 (FIG. 9) than they would normally listen to.

Task 176 causes alarm 84 (FIG. 2) of bias compensator 72 to issue notice 88 (FIG. 2) to inform an operator of the discrepancy between station ADL value 74 and multi-station ADL parameter 86. Notice 88 may be an audible "beep", a highlighted flag, or another attention grabber on a display or printed report. In the exemplary situation in spreadsheet is array 160 (FIG. 9), an operator is informed through notice 88 that first station ADL value 74, is not approximately equal to multi-station ADL parameter 86'.

Following task 176, a query task 178 determines if a sensitivity level for a portion of LO signals 26 corresponding to the one of radio stations 162 should be adjusted. When query task 178 determines that the sensitivity level should not be adjusted, process 152 proceeds to task 174 (discussed below). A negative response to query task 178 indicates that the discrepancy between station ADL value 74 and multi-station ADL parameter 86 is not due to station bias (as previously discussed), therefore the survey data for the one of radio stations 162 is valid. A decision in query task 178 may, but does not necessarily require, human input.

When bias compensator 42 (FIG. 2) determines in query task 178 that the sensitivity level should be adjusted, program control proceeds to a task 180. Task 180 causes comparator 80 (FIG. 2) of bias compensator 142 to send adjustment parameters (not shown) over link 78 (FIG. 2) to receiver 36 (FIG. 2).

In the preferred embodiment, adjustment parameters are automatically calculated by comparator 80 to modify signal strength threshold 54 (FIG. 2) and/or noise quieting threshold 56 (FIG. 2) for one of LO signals 26. Additionally, adjustment parameters may be calculated by comparator 80 to modify antenna attenuator value 50 and/or gain value 52 for one of LO signals 26.

The modifications produced by task 180 result in an adjusted sensitivity level, for example, an adjusted first sensitivity level 146' (FIG. 7) for first LO signals 26' during a future survey period, such as a second survey period 130". In the exemplary situation shown in graph 128 (FIG. 7), first sensitivity level 146' is lower than first sensitivity level 146. A lower first sensitivity level 146' may increase the likelihood of detection of LO signals 26' during second survey period 130". This produces a bias in favor of LO signals 26' in order to offset station bias against LO signals 26' possibly caused by environmental conditions or electronic noise in detection zone 30 (FIG. 1). First sensitivity level 146' should result in a longer station ADL value 74' for LO signals 26' so as to cause first station ADL value 74' for second survey period 130" to more closely equal a multi-station ADL parameter 86" (FIG. 8) for second survey period 130".

When station ADL value 74 is approximately equal to multi-station ADL parameter 86 in the next one of survey periods 130, the adjustments made during the previous one of survey periods 130 have adequately compensated for station bias directed towards or against first radio station 162.

Adjustment parameters for each of LO frequencies 98 (FIG. 9) relating to LO signals 26, are communicated to scanning receiver 36 (FIG. 2) via link 78 (FIG. 2) during a single transmission event (not shown). These adjustment parameters produce modifications to antenna attenuator value 50, gain value 52, SS threshold 54, and NQ threshold 56 specific to LO signals 26. The transmission event desirably takes place prior to the initiation of the next one of survey periods 130.

Following task 180, or as stated previously, following an affirmative response to query task 172 or a negative response to query task 178, query task 174 is performed. Query task 174 determines if there is another one of radio stations 162 during one of survey periods 130 for which a station ADL value 74 is to be validated. If there is another one of radio stations, process 152 loops back to task 170 to perform processing for another one of radio stations 162.

When task 174 determines that there are no more radio stations 162 that have survey data to be processed, program control loops back to task 154. This process may be repeated approximately every twenty-four hours or as desired to provide compensation for a second station bias during another one of survey period 130 which may be caused by fluctuating environmental conditions or changing levels of electronic noise.

Although process 152 is described as compensating for fluctuating environmental conditions and changing levels of electronic noise, one skilled in the art will recognize that bias compensating process 152 is able to compensate for other unnamed factors that may lead to station bias, since the station bias is identified when station ADL value 74 differs from multi-station ADL parameter 86.

In summary, the present invention provides a system and method for compensating for station bias when identifying the stations to which tuners are tuned. Since station bias is compensated for, the system and method of the present invention improves the accuracy of the audience survey data. Improved accuracy of the survey data is obtained by providing a parameter for determining the bias, toward or against individual or groups of radio stations, in a given survey period. Furthermore, the present invention notifies an operator when a station bias is present in the survey data.

Although the preferred embodiments of the invention have been illustrated and described in detail, it will be readily apparent to those skilled in the art that various modifications may be made therein without departing from the spirit of the invention or from the scope of the appended claims. For example, the station average detection level values may be adjusted with parameters other than those described herein. Those skilled in the art can distribute the processing functions described herein between a receiver, data logging computer, compiling computer, and bias compensator differently than indicated herein, or can combine functions which are indicated herein as being performed at different components of the system. Furthermore, those skilled in the art will appreciate that the present invention will accommodate a wide variation in the specific tasks and specific task ordering used to accomplish the process described herein.

What is claimed is:

1. In a remote audience survey system, a method of compensating for a station bias, said survey system being configured to identify radio stations to which tuners are tuned, said tuners having predetermined signals emitted therefrom, and said method comprising the steps of:

measuring durations during which a portion of said predetermined signals are received by said survey system, said portion of said predetermined signals describing one of said radio stations;

combining said durations to form a characteristic detection statistic for said one radio station; and adjusting a sensitivity level to provide an amplitude threshold for said one radio station in response to said characteristic detection statistic to compensate for said station bias prior to collecting survey data.

2. A method as claimed in claim 1 wherein said durations are first durations, said portion of predetermined signals are first predetermined signals, and said measuring step additionally comprises the steps of:

measuring second durations over which second predetermined signals are identified by said survey system, said second predetermined signals describing a second one of said radio stations; and merging said first and second durations to establish a detection parameter.

3. A method as claimed in claim 1 wherein:

said sensitivity level is adjusted by modifying one of a signal strength threshold, a noise quieting threshold, a gain value, and an antenna attenuation value in said survey system for said one radio station.

4. A method as claimed in claim 3 wherein:

said noise quieting threshold is a maximum level of noise quieting said survey system achieves in the presence of said portion of said predetermined signals for said one radio station; and said modifying step changes said noise quieting threshold.

5. A method as claimed in claim 1 wherein said station bias is exhibited during a first survey period, and said adjusting step adjusts said sensitivity level to compensate for said station bias during a second survey period, said second survey period following said first survey period.

6. A method as claimed in claim 1 wherein:

said station bias is a first bias in a first survey period; and said method further comprises the step of repeating said measuring, combining, comparing, and adjusting steps in response to a second bias in a second survey period.

7. A method as claimed in claim 1 wherein said portion of said predetermined signals are local oscillator signals emitted by said tuners.

* * * * *